(12) United States Patent
Marks

(10) Patent No.: US 8,188,968 B2
(45) Date of Patent: May 29, 2012

(54) METHODS FOR INTERFACING WITH A PROGRAM USING A LIGHT INPUT DEVICE

(75) Inventor: Richard L. Marks, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 775 days.

(21) Appl. No.: 11/963,456

(22) Filed: Dec. 21, 2007

(65) Prior Publication Data

US 2008/0094353 A1     Apr. 24, 2008

Related U.S. Application Data

(63) Continuation of application No. 10/759,782, filed on Jan. 16, 2004, now Pat. No. 7,623,115, which is a continuation-in-part of application No. 10/207,677, filed on Jul. 27, 2002, now Pat. No. 7,102,615.

(51) Int. Cl.
*G09G 5/00*     (2006.01)

(52) U.S. Cl. .................. 345/156; 345/168; 345/169

(58) Field of Classification Search .............. 345/7, 32, 345/156–158, 163, 168, 169, 173, 175, 419, 345/473, 474, 593; 382/104; 351/205, 211, 351/221; 348/143, 211.6, 211.9, 171, 579, 348/587; 340/425.5; 702/152
See application file for complete search history.

(56) References Cited

U.S. PATENT DOCUMENTS

| | | | |
|---|---|---|---|
| 3,943,277 A | 3/1976 | Everly et al. ............... 348/19 |
| 4,263,504 A | 4/1981 | Thomas .................... 235/454 |
| 4,313,227 A | 1/1982 | Eder ........................ 398/106 |
| 4,558,864 A | 12/1985 | Medwedeff ............ 273/148 B |
| 4,565,999 A | 1/1986 | King et al. ................ 345/158 |
| 4,787,051 A | 11/1988 | Olson ....................... 364/518 |
| 4,802,227 A | 1/1989 | Elko et al. .................. 381/92 |
| 4,823,001 A | 4/1989 | Kobayashi et al. ........ 356/616 |
| 4,843,568 A | 6/1989 | Krueger et al. .......... 364/518 |
| 5,034,986 A | 7/1991 | Karmann et al. ........ 382/103 |

(Continued)

FOREIGN PATENT DOCUMENTS

EP     0353200     1/1990

(Continued)

OTHER PUBLICATIONS

Kanade, et al., "A Stereo Machine for Video-rate Dense Depth Mapping and Its New Application" 1996, CVPR 96, IEEE Computer Society Conference, pp. 196-202 (022).

(Continued)

*Primary Examiner* — Prabodh M Dharia
(74) *Attorney, Agent, or Firm* — Martine Penilla Group, LLP

(57) ABSTRACT

An input device for interfacing with a computing device is provided. The input device includes a body configured to be held within a human hand. The input device includes a light emitting diode (LED) affixed to the body and a power supply for the LED. A mode change activator is integrated into the body, where the mode change activator is configured to cause a change of a color of a light originating from the LED. The color change is capable of being detected to cause a mode change at the computing device. Methods for detecting input commands from an input source within a field of sight of an image capture device, and a computing system which includes the input device are provided.

17 Claims, 12 Drawing Sheets

U.S. PATENT DOCUMENTS

| | | | |
|---|---|---|---|
| 5,055,840 A | 10/1991 | Bartlett | 341/31 |
| 5,111,401 A | 5/1992 | Everett et al. | 701/24 |
| 5,128,671 A | 7/1992 | Thomas, Jr. | 341/20 |
| 5,144,594 A | 9/1992 | Gilchrist | 367/129 |
| 5,260,556 A | 11/1993 | Lake et al. | 235/494 |
| 5,297,061 A | 3/1994 | Dementhon et al. | 345/180 |
| 5,335,011 A | 8/1994 | Addeo et al. | 348/15 |
| 5,394,168 A | 2/1995 | Smith, III et al. | 345/156 |
| 5,426,296 A * | 6/1995 | Shikai et al. | 250/227.2 |
| 5,426,450 A | 6/1995 | Drumm | 345/168 |
| 5,455,685 A | 10/1995 | Mori | 348/363 |
| 5,473,701 A | 12/1995 | Cezanne et al. | 381/92 |
| 5,485,273 A | 1/1996 | Mark et al. | 356/350 |
| 5,517,333 A | 5/1996 | Tamura et al. | 358/158 |
| 5,528,265 A | 6/1996 | Harrison | 345/158 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,000 A | 3/1997 | Szeliski et al. | 382/294 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,677,710 A | 10/1997 | Thompson-Rohrlich | 345/173 |
| 5,706,364 A | 1/1998 | Kopec et al. | 382/159 |
| 5,734,915 A * | 3/1998 | Roewer | 715/202 |
| 5,757,425 A * | 5/1998 | Barton et al. | 348/241 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,842,191 A * | 11/1998 | Stearns | 706/40 |
| 5,846,086 A | 12/1998 | Bizzi et al. | 434/247 |
| 5,850,222 A | 12/1998 | Cone | 345/418 |
| 5,850,473 A | 12/1998 | Andersson | 382/156 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,917,936 A | 6/1999 | Katto | 382/154 |
| 5,923,318 A | 7/1999 | Zhai et al. | 345/157 |
| 5,929,444 A | 7/1999 | Leichner | 250/341.7 |
| 5,930,383 A | 7/1999 | Netaer | 382/154 |
| 5,930,741 A | 7/1999 | Kramer | 702/153 |
| 5,937,081 A | 8/1999 | O'Brill et al. | 382/111 |
| 5,949,402 A * | 9/1999 | Garwin et al. | 345/156 |
| 5,959,596 A | 9/1999 | McCarten et al. | 345/2 |
| 5,963,250 A | 10/1999 | Parker et al. | 348/211.6 |
| 5,982,555 A * | 11/1999 | Melville et al. | 359/630 |
| 5,993,314 A | 11/1999 | Dannenberg et al. | 461/1 |
| 6,009,210 A | 12/1999 | Kang | 382/276 |
| 6,014,167 A | 1/2000 | Suito et al. | 348/169 |
| 6,021,219 A | 2/2000 | Andersson et al. | 382/190 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,072,494 A | 6/2000 | Nguyen | 715/863 |
| 6,075,895 A | 6/2000 | Qiao et al. | 382/218 |
| 6,091,905 A | 7/2000 | Yahav et al. | 396/106 |
| 6,097,369 A | 8/2000 | Wambach | 345/158 |
| 6,100,517 A | 8/2000 | Yahav et al. | 250/208.1 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A | 11/2000 | Kanade et al. | 345/641 |
| 6,157,368 A | 12/2000 | Fager | 345/156 |
| 6,160,540 A | 12/2000 | Fishkin et al. | 345/184 |
| 6,173,059 B1 | 1/2001 | Huang et al. | 381/92 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,074 B1 | 6/2001 | Fishkin et al. | 345/156 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,297,838 B1 | 10/2001 | Chang et al. | 715/863 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,375,572 B1 | 4/2002 | Masuyama et al. | 463/43 |
| 6,392,644 B1 | 5/2002 | Miyata et al. | 345/419 |
| 6,393,142 B1 | 5/2002 | Swain et al. | 382/154 |
| 6,394,897 B1 | 5/2002 | Togami | 463/4 |
| 6,400,374 B2 | 6/2002 | Lanier | 345/630 |
| 6,411,392 B1 | 6/2002 | Bender et al. | 358/1.14 |
| 6,411,744 B1 | 6/2002 | Edwards | 382/294 |
| 6,417,836 B1 * | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,498,860 B1 | 12/2002 | Sasaki et al. | 382/103 |
| 6,513,160 B2 | 1/2003 | Dureau | 725/9 |
| 6,533,420 B1 | 3/2003 | Eichenlaub | 353/7 |
| 6,542,927 B2 | 4/2003 | Rhoads | 709/217 |
| 6,545,706 B1 | 4/2003 | Edwards et al. | 348/169 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 * | 7/2003 | Stam et al. | 382/104 |
| 6,593,956 B1 | 7/2003 | Potts et al. | 348/14.09 |
| 6,595,642 B2 | 7/2003 | Wirth | 351/211 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,674,415 B2 | 1/2004 | Nakamura et al. | 345/32 |
| 6,677,967 B2 | 1/2004 | Sawano et al. | 715/839 |
| 6,677,987 B1 * | 1/2004 | Girod | 348/171 |
| 6,709,108 B2 | 3/2004 | Levine et al. | 351/211 |
| 6,720,949 B1 | 4/2004 | Pryor et al. | 345/158 |
| 6,727,988 B2 | 4/2004 | Kim et al. | 356/319 |
| 6,729,731 B2 * | 5/2004 | Gnanamgari et al. | 353/42 |
| 6,741,741 B2 | 5/2004 | Farrell | 382/199 |
| 6,746,124 B2 | 6/2004 | Fischer et al. | 353/43 |
| 6,751,338 B1 | 6/2004 | Wallack | 382/106 |
| 6,753,849 B1 | 6/2004 | Curran et al. | 345/158 |
| 6,769,769 B2 | 8/2004 | Podoleanu et al. | 351/221 |
| 6,772,057 B2 | 8/2004 | Breed et al. | 701/45 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,791,512 B1 * | 9/2004 | Shimada | 345/32 |
| 6,791,531 B1 | 9/2004 | Johnston et al. | 345/157 |
| 6,795,068 B1 | 9/2004 | Marks | 345/419 |
| 6,809,776 B1 | 10/2004 | Simpson et al. | 348/565 |
| 6,819,318 B1 | 11/2004 | Geng | 345/420 |
| 6,847,311 B2 | 1/2005 | Li | 341/28 |
| 6,856,935 B1 * | 2/2005 | Fehlis et al. | 702/152 |
| 6,881,147 B2 | 4/2005 | Naghi et al. | 463/35 |
| 6,885,492 B2 * | 4/2005 | DeSimone et al. | 359/290 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,928,180 B2 | 8/2005 | Stam et al. | 382/104 |
| 6,931,125 B2 | 8/2005 | Smallwood | 379/433.07 |
| 6,943,776 B2 | 9/2005 | Ehrenburg | 345/168 |

| Patent No. | Date | Inventor | Class |
|---|---|---|---|
| 6,947,576 B2 | 9/2005 | Stam et al. | 382/104 |
| 6,951,515 B2 | 10/2005 | Ohshima et al. | 463/31 |
| 6,952,198 B2 | 10/2005 | Hansen | 345/158 |
| 6,970,183 B1 | 11/2005 | Monroe | 348/143 |
| 6,972,892 B2 * | 12/2005 | DeSimone et al. | 359/290 |
| 6,990,639 B2 | 1/2006 | Wilson | 715/863 |
| 7,016,411 B2 | 3/2006 | Azuma et al. | 375/240.08 |
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,043,019 B2 * | 5/2006 | Tehranchi et al. | 380/218 |
| 7,043,056 B2 | 5/2006 | Edwards et al. | 382/103 |
| 7,054,452 B2 | 5/2006 | Ukita | 381/92 |
| 7,059,962 B2 | 6/2006 | Watashiba | 463/2 |
| 7,061,507 B1 | 6/2006 | Tuomi et al. | 345/611 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,116,330 B2 | 10/2006 | Marshall et al. | 345/474 |
| 7,139,767 B1 | 11/2006 | Taylor et al. | 707/102 |
| 7,148,922 B2 | 12/2006 | Shimada | 348/370 |
| 7,161,634 B2 | 1/2007 | Long | 384/624 |
| 7,164,413 B2 | 1/2007 | Davis et al. | 345/163 |
| 7,183,929 B1 | 2/2007 | Antebi et al. | 340/573.1 |
| 7,212,308 B2 | 5/2007 | Morgan | 358/1.18 |
| 7,223,173 B2 | 5/2007 | Masuyama et al. | 463/36 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | 382/103 |
| 7,245,273 B2 | 7/2007 | Eberl et al. | 351/211 |
| 7,259,375 B2 | 8/2007 | Tichit et al. | 250/341.8 |
| 7,263,462 B2 | 8/2007 | Funge et al. | 702/179 |
| 7,274,305 B1 | 9/2007 | Luttrell | 340/870.02 |
| 7,277,526 B2 | 10/2007 | Rifkin et al. | 345/156 |
| 7,283,679 B2 | 10/2007 | Okada et al. | 382/260 |
| 7,286,753 B2 * | 10/2007 | Yamasaki | 396/51 |
| 7,296,007 B1 | 11/2007 | Funge et al. | 706/47 |
| 7,301,530 B2 | 11/2007 | Lee et al. | 345/158 |
| 7,305,114 B2 | 12/2007 | Wolff et al. | 709/200 |
| 7,346,387 B1 | 3/2008 | Wachter et al. | 600/476 |
| 7,352,359 B2 | 4/2008 | Zalewski et al. | 345/156 |
| 7,364,297 B2 | 4/2008 | Goldfain et al. | 351/206 |
| 7,379,559 B2 | 5/2008 | Wallace et al. | 382/100 |
| 7,391,409 B2 | 6/2008 | Zalewski et al. | 345/156 |
| 7,401,920 B1 * | 7/2008 | Kranz et al. | 351/210 |
| 7,436,887 B2 | 10/2008 | Yeredor et al. | 375/240 |
| 7,446,650 B2 | 11/2008 | Schofield et al. | 340/425.5 |
| 7,460,110 B2 * | 12/2008 | Ung et al. | 345/156 |
| 7,545,926 B2 | 6/2009 | Mao | 379/406.08 |
| 7,558,698 B2 | 7/2009 | Funge et al. | 702/179 |
| 7,613,610 B1 | 11/2009 | Zimmerman et al. | 704/235 |
| 7,623,115 B2 * | 11/2009 | Marks | 345/156 |
| 7,626,569 B2 * | 12/2009 | Lanier | 345/156 |
| 7,627,139 B2 | 12/2009 | Marks et al. | 382/103 |
| 7,636,645 B1 | 12/2009 | Yen et al. | 702/152 |
| 7,697,700 B2 | 4/2010 | Mao | 381/94.3 |
| 7,721,231 B2 | 5/2010 | Wilson | 715/863 |
| 2001/0056477 A1 | 12/2001 | McTernan et al. | 709/219 |
| 2002/0085097 A1 | 7/2002 | Colmenarez et al. | 348/211 |
| 2002/0134151 A1 | 9/2002 | Naruoka et al. | 73/291 |
| 2003/0022716 A1 | 1/2003 | Park et al. | 463/36 |
| 2003/0093591 A1 | 5/2003 | Hohl | 710/22 |
| 2003/0100363 A1 | 5/2003 | Ali | 436/30 |
| 2003/0123705 A1 | 7/2003 | Stam et al. | 382/104 |
| 2003/0139886 A1 * | 7/2003 | Bodzin et al. | 702/28 |
| 2003/0160862 A1 | 8/2003 | Charlier et al. | 348/14.08 |
| 2004/0001082 A1 | 1/2004 | Said | 345/730 |
| 2004/0017355 A1 | 1/2004 | Shim | 345/157 |
| 2004/0063480 A1 | 4/2004 | Wang | 463/8 |
| 2004/0063481 A1 | 4/2004 | Wang | 463/8 |
| 2004/0070565 A1 * | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0178576 A1 | 9/2004 | Hillis et al. | 273/148 |
| 2004/0212589 A1 | 10/2004 | Hall et al. | 345/156 |
| 2004/0213419 A1 | 10/2004 | Varma et al. | 381/92 |
| 2004/0227725 A1 | 11/2004 | Calarco et al. | 345/156 |
| 2004/0254017 A1 | 12/2004 | Cheng | 463/35 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0105777 A1 | 5/2005 | Kozlowski et al. | 382/115 |
| 2005/0117045 A1 | 6/2005 | Abdellatif et al. | 384/335 |
| 2005/0226431 A1 | 10/2005 | Mao | 381/61 |
| 2006/0033713 A1 | 2/2006 | Pryor | 345/158 |
| 2006/0035710 A1 | 2/2006 | Festejo et al. | 463/36 |
| 2006/0038819 A1 | 2/2006 | Festejo et al. | 345/530 |
| 2006/0204012 A1 | 9/2006 | Marks et al. | 381/26 |
| 2006/0233389 A1 | 10/2006 | Mao et al. | 381/92 |
| 2006/0250681 A1 | 11/2006 | Park et al. | 345/156 |
| 2006/0252541 A1 | 11/2006 | Zalewski et al. | 463/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 436/37 |
| 2006/0287087 A1 | 12/2006 | Zalewski et al. | 463/37 |
| 2007/0015559 A1 | 1/2007 | Zalewski et al. | 463/1 |
| 2007/0021208 A1 | 1/2007 | Mao et al. | 463/36 |
| 2007/0025562 A1 | 2/2007 | Zalewski et al. | 381/92 |
| 2007/0061413 A1 | 3/2007 | Larsen et al. | 709/217 |
| 2007/0066394 A1 | 3/2007 | Ikeda et al. | 463/37 |
| 2007/0072675 A1 | 3/2007 | Hamano et al. | 463/42 |
| 2007/0120834 A1 | 5/2007 | Boillot | 354/103 |
| 2007/0120996 A1 | 5/2007 | Boillot | 384/345 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2008/0056561 A1 | 3/2008 | Sawachi | 382/154 |
| 2008/0070684 A1 | 3/2008 | Haigh-Hutchinson | 463/32 |
| 2008/0091421 A1 | 4/2008 | Gustavsson | 704/233 |
| 2009/0010494 A1 | 1/2009 | Bechtel et al. | 382/104 |
| 2009/0016642 A1 | 1/2009 | Hart | 382/278 |
| 2009/0221368 A1 | 9/2009 | Yen et al. | 463/32 |
| 2009/0221374 A1 | 9/2009 | Yen et al. | 463/42 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |

FOREIGN PATENT DOCUMENTS

| | | |
|---|---|---|
| EP | 0652686 | 5/1995 |
| EP | 0750202 | 12/1996 |
| EP | 0835676 | 4/1998 |
| EP | 1098686 | 5/2003 |
| EP | 1435258 | 7/2004 |
| FR | 2814965 | 4/2002 |
| GB | 2206716 | 11/1989 |
| GB | 2376397 | 11/2002 |
| GB | 2388418 | 11/2003 |
| JP | 1284897 | 11/1989 |
| JP | 6102980 | 4/1994 |
| JP | 9128141 | 5/1997 |
| JP | 9185456 | 7/1997 |
| JP | 1138949 | 2/1999 |
| JP | 2000-172431 | 6/2000 |
| JP | 2001-166676 | 6/2001 |
| JP | 2004-145448 | 5/2004 |
| WO | WO 88/05942 | 8/1988 |
| WO | WO 98/48571 | 10/1998 |
| WO | WO 99/26198 | 10/1999 |
| WO | WO 02/27456 | 2/2002 |
| WO | WO 03/079179 | 9/2003 |
| WO | WO 2005/073838 | 8/2005 |
| WO | WO 2008/056180 | 5/2008 |

OTHER PUBLICATIONS

Gvili et al., "Depth Keying", SPIE vol. 5006 (2003), 2003 SPIE-IS &T, pp. 564-574 (031).

Ephraim et al. "Speech Enhancement Using a Minimum Mean-Square Error Log-Spectral Amplitude Estimator", 1985, IEEE.

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

"The Tracking Cube: A Three-Dimentional Input Device", IBM Technical Disclosure Bulletin, Aug. 1, 1989, pp. 91-95, No. 3B, IBM Corp.New York, U.S.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (and Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Bolt, R.A., "Put-that-there: voice and gesture at the graphics interface",Computer Graphics, vol. 14, No. 3 (ACM SIGGRAPH Conference Proceedings) Jul. 1980, pp. 262-270.

DeWitt, Thomas and Edelstein, Phil "Pantomation: A System for Position Tracking", Proceedings of the $2^{nd}$ Symposium on Small Computers in the Arts, Oct. 1982, pp. 61-69.

* cited by examiner

METHODS FOR INTERFACING WITH A PROGRAM USING A LIGHT INPUT DEVICE

CLAIM OF PRIORITY

This application is a continuation of U.S. patent application Ser. No. 10/759,782, filed on Jan. 16, 2004, now U.S. Pat. No. 7,623,115, entitled "Method and Apparatus for Light Input Device", which is a continuation-in-part claiming priority under 35 U.S.C. §120 of U.S. patent application Ser. No. 10/207,677 filed on Jul. 27, 2002, now U.S. Pat. No. 7,102,615, and entitled "MAN-MACHINE INTERFACE USING DEFORMABLE DEVICE." These applications, now issued U.S. patents, are herein incorporated by reference.

BACKGROUND OF THE INVENTION

1. Field of the Invention

This invention relates generally to alternative input mechanisms to computer systems, and more particularly to visually tracking a light, wherein a change in the light triggers an action on the part of the computer system.

2. Description of the Related Art

There has been a great deal of interest in searching for alternatives to input devices for computing systems. The keyboard and mouse for the desktop computing system are taken for granted at this time. However, for interactive entertainment applications in a "living room" environment, the keyboard and the mouse have failed to gain widespread acceptance.

Tracking of moving objects using digital video cameras and processing the video images for producing various displays has been attempted also. However, these systems tend to rely on having a plurality of video cameras available for developing positional information about the object based on triangulation. The cost for these systems becomes prohibitive for their introduction into the "living room" environment.

However, in spite of the above knowledge and techniques, problems continue to hinder successful object tracking, and a particularly difficult problem is extracting precisely only those pixels of a video image which correspond unambiguously to an object of interest. For example, although movement of an object having one color against a solid background of another color, where the object and background colors vary distinctly from one another, can be accomplished with relative ease, tracking of objects, even if brightly colored, is not so easy in the case of multi-colored or non-static backgrounds. Changes in lighting also dramatically affect the apparent color of the object as seen by the video camera, and thus object tracking methods which rely on detecting a particular colored object are highly susceptible to error or require constant re-calibration as lighting conditions change. The typical home use environment for video game programs demands much greater flexibility and robustness than possible with conventional object tracking computer vision systems.

Thus, an alternative input device must be able to be tracked under the home use environment by a single relatively inexpensive camera in order to become widely accepted. Additionally, the alternative input device must be convenient to use. While a glove worn on the hand of a user, where the glove includes sensors that are tracked by a camera to capture input, has been trialed, users have not embraced the glove. One of the reasons for the lack of enthusiasm for a glove is the inconvenience of having to continually remove and put on the glove. Furthermore, the alternative input devices described above do not easily adapt themselves to being able to indicate a mode change, functionally similar to a mouse click.

Thus, there is a need to solve the problems of the prior art to provide an input device capable of being tracked by a single video camera, wherein the input device is convenient for the user and capable of indicating a mode change.

SUMMARY OF THE INVENTION

Broadly speaking, the present invention fills these needs by providing a method and system that provides a device capable of producing one or more colors of light (or variations of a single or multiple light shades) where a change or variation triggers a mode change to the system controlling a display of image data. As used herein, a mode change refers to a discrete event or action triggered through the detection of a change in light emitted from an input device. It should be appreciated that the present invention can be implemented in numerous ways, including as a process, a system, or a device. Several inventive embodiments of the present invention are described below.

In one embodiment a method for triggering input commands of a program run on a computing system is provided. The method initiates with monitoring a field of view in front of an image capture device. Then, a light source within the field of view is identified. Next, a change in the light emitted from the light source is detected. In response to detecting the change, an input command is triggered at the program run on the computing system.

In another embodiment, a method for detecting input commands from an input source within a field of sight of an image capture device is provided. The method initiates with minimizing an amount of light entering the image capture device. Then, a first color light signal is detected from the input source through the image capture device. Next, a change from the first color light signal to a second color light signal is detected. Then, a mode change is triggered in response to the change in the first color light signal.

In yet another embodiment, a computer readable medium having program instructions for triggering input commands of a program run on a computing system is provided. The computer readable medium includes program instructions for monitoring a field of view in front of an image capture device. Program instructions for identifying a light source within the field of view and program instructions for detecting a change in light emitted from the light source are included. Program instructions for triggering an input command at the program run on the computing system in response to detecting the change are included.

In still yet another embodiment, a computer readable medium having program instructions for detecting input commands from an input source within a field of sight of an image capture device is provided. The computer readable medium includes program instructions for minimizing an amount of light entering the image capture device and program instructions for detecting a first color light signal from the input source through the image capture device. Program instructions for detecting a change from the first color light signal to a second color light signal and program instructions for triggering a mode change in response to the change in the first color light signal are provided.

In another embodiment, a computing system having an input detection system, that determines when to trigger input commands of a main program run through the computing system is provided. The computing system includes an image capture device. Logic for monitoring a field of view associated with the image capture device and logic for tracking a position of a light source associated with an input object are included. Logic for detecting a color change in the light source and logic for triggering an input command at the main program run through the computing system, where the triggering is a result of the detected color change in the light source are included.

In yet another embodiment, an input device for interfacing with a computing device is provided. The input device includes a body configured to be held within a human hand. The input device includes a light emitting diode (LED) affixed to the body and a power supply for the LED. A mode change activator is integrated into the body, where the mode change activator is configured to cause a change of a color of a light originating from the LED. The color change is capable of being detected to cause a mode change at the computing device.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

An invention is disclosed for an input device that is capable of emitting multiple colors/frequencies of light in order to trigger an event. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The embodiments of the present invention provide a user input device that is capable of emitting multiple colors of light which are captured through an image capture device. The changing from one light color to another initiates an event or action that can be displayed on a monitor. For example, the change from one light color to another can signify a mouse click, i.e., a mode change, to open a file or window for a personal computer, grab, drag or manipulate an image for a computer game, or even start a smart appliance. It should be appreciated that the input device includes some type of button, or actuator, which is used to change between light colors being emitted from a light emitting diode (LED). Thus, the input device will include some sort of power supply for the LED also. As will be explained by the embodiments described herein the light input device allows for the introduction of an experience that can be related to a mouse click while being convenient for the user. It should be appreciated that the light device is a "dumb" device. That is, no active communication takes place between the input device and the computer as the computer, in essence, watches for the light input device. In one embodiment, the light input device is configured as a flashlight. Of course, the light input device may be cordless, e.g., battery powered for the generation of light.

Figure 1A:
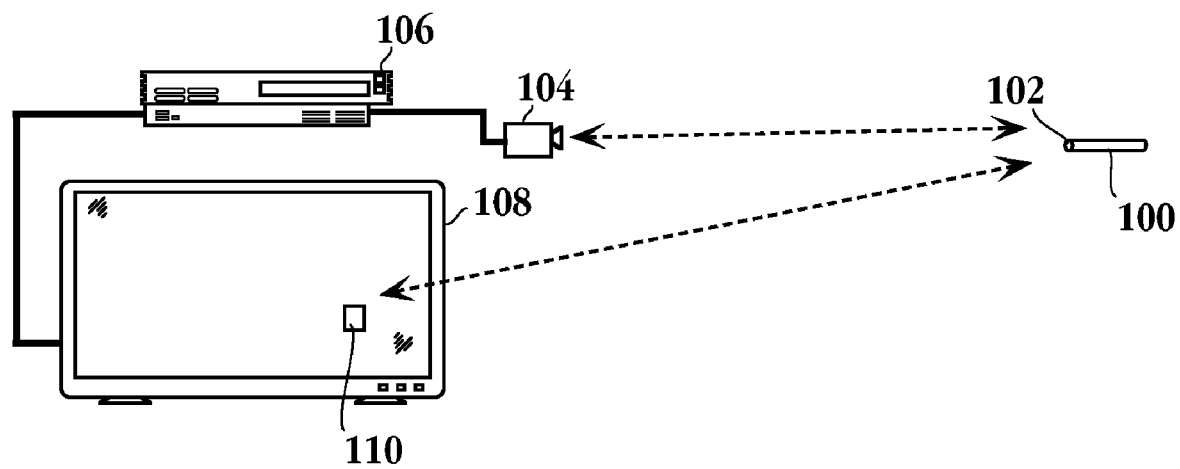
FIG. 1A is a simplified schematic diagram of a system having the capability of input detection from a light source in order to trigger a mode change in accordance with one embodiment of the invention.

FIG. 1A is a simplified schematic diagram of a system having the capability of input detection from a light source in order to trigger a mode change in accordance with one embodiment of the invention. Image capture device 104 is in communication with computing device 106, which in turn is in communication with display screen 108. Input device 100 includes a light source 102. For example, light source 102 may be a suitable light emitting diode (LED). Light emanating from LED 102 is detected by image capture device 104. It should be appreciated that image capture device 104 may be any suitable image capture device capable of detecting light from LED 102. For example, any suitable web cam or other camera may be used as image capture device 104. The location in space of LED 102 is used to control movement of cursor 110 on display screen 108 in one embodiment. That is, as input device 100, and associated LED 102, is moved in space, that movement is translated in order to move cursor 110. Additionally, as will be explained in more detail below, input device 100, through LED 102, may cause a mode change, similar to the mode change initiated by clicking a mouse for a desktop computer. As mentioned above, a mode change refers to a discrete event or action triggered through the detection of a change in light emitted from an input device. In essence, input device 100 may be used as a computer mouse through color changes associated with LED 102. Exemplary mode changes include mode changes associated with mouse-type operations where the movement features of the mouse in conjunction with the selection features, i.e., clicking, double clicking, and right clicking, are incorporated into the system described below. That is, the tracking features of the system capture the movement of the input device while the light color changes provide the means to capture selection features. While a mode change has been described in relation to mouse-type operations, it should be appreciated that the embodiments are not limited to mouse-type operations. That is, any suitable discrete operation or action is included here.

Figure 1B:
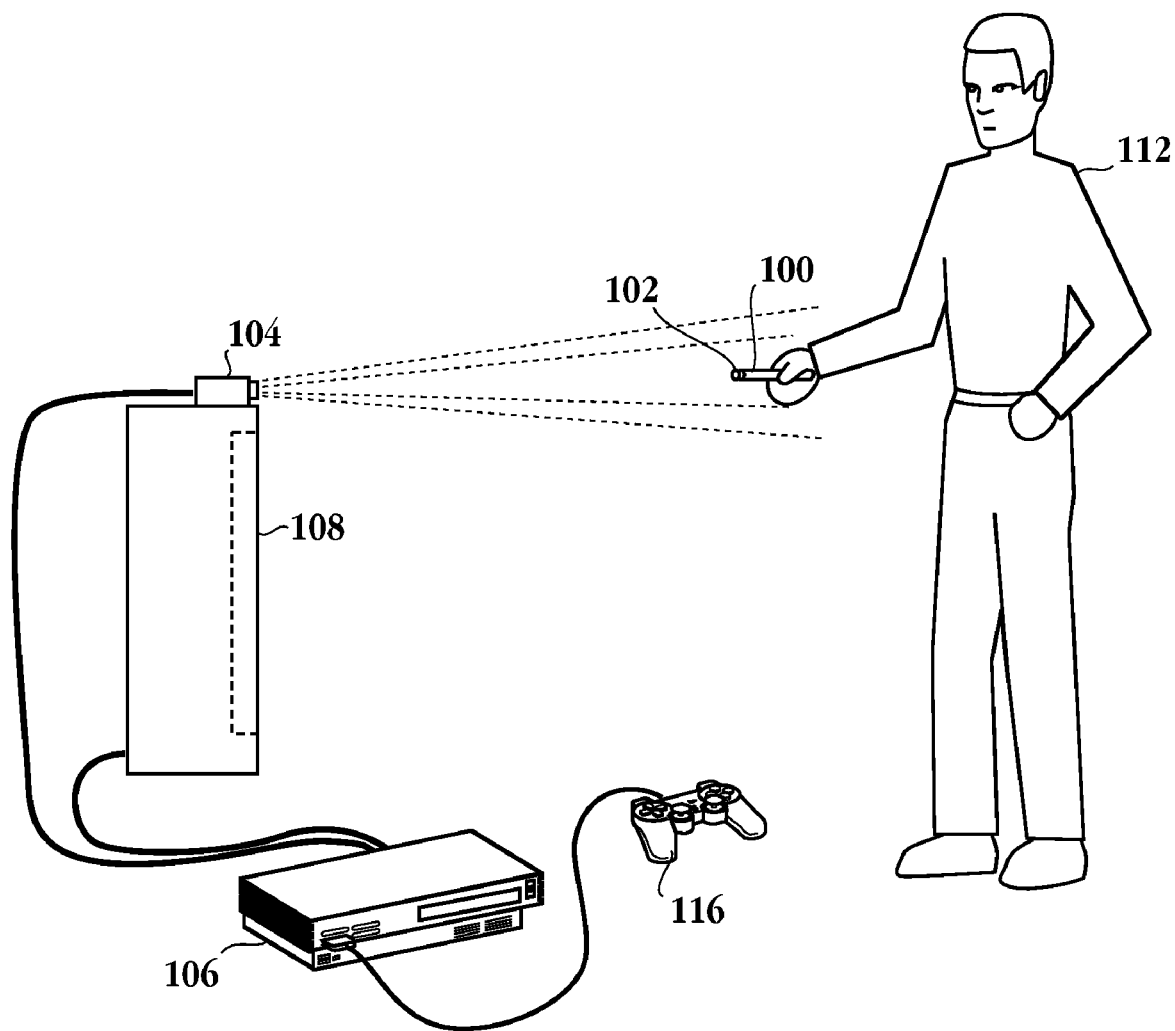
FIG. 1B is an alternative representation of the system depicted in FIG. 1A.

FIG. 1B is an alternative representation of the system depicted in FIG. 1A. Here, user 112 is holding input device 100 within his hand. LED 102 which is affixed to an end of input device 100, is within a detection region of image capture device 104. Image capture device 104 is in communication with computing device 106 which is in communication with display screen 108. In one embodiment, computing device 106 is any suitable video game console, e.g., the PLAYSTATION 2 console. Controller 116 is also in communication with computing device 106. Thus, user 112 may move input device 100 from an initial location, thereby changing the position of LED 102 relative to camera 104. This relative movement is then translated in order to move a cursor on display screen 108. Additionally, a mode change associated with the cursor being moved on display screen 108 is triggered through a change in the color of light emitted from LED 102. It should be appreciated that the embodiments described herein provide for a mouse-like device to be introduced in the living room for interactive entertainment and any other suitable application.

Figure 2:
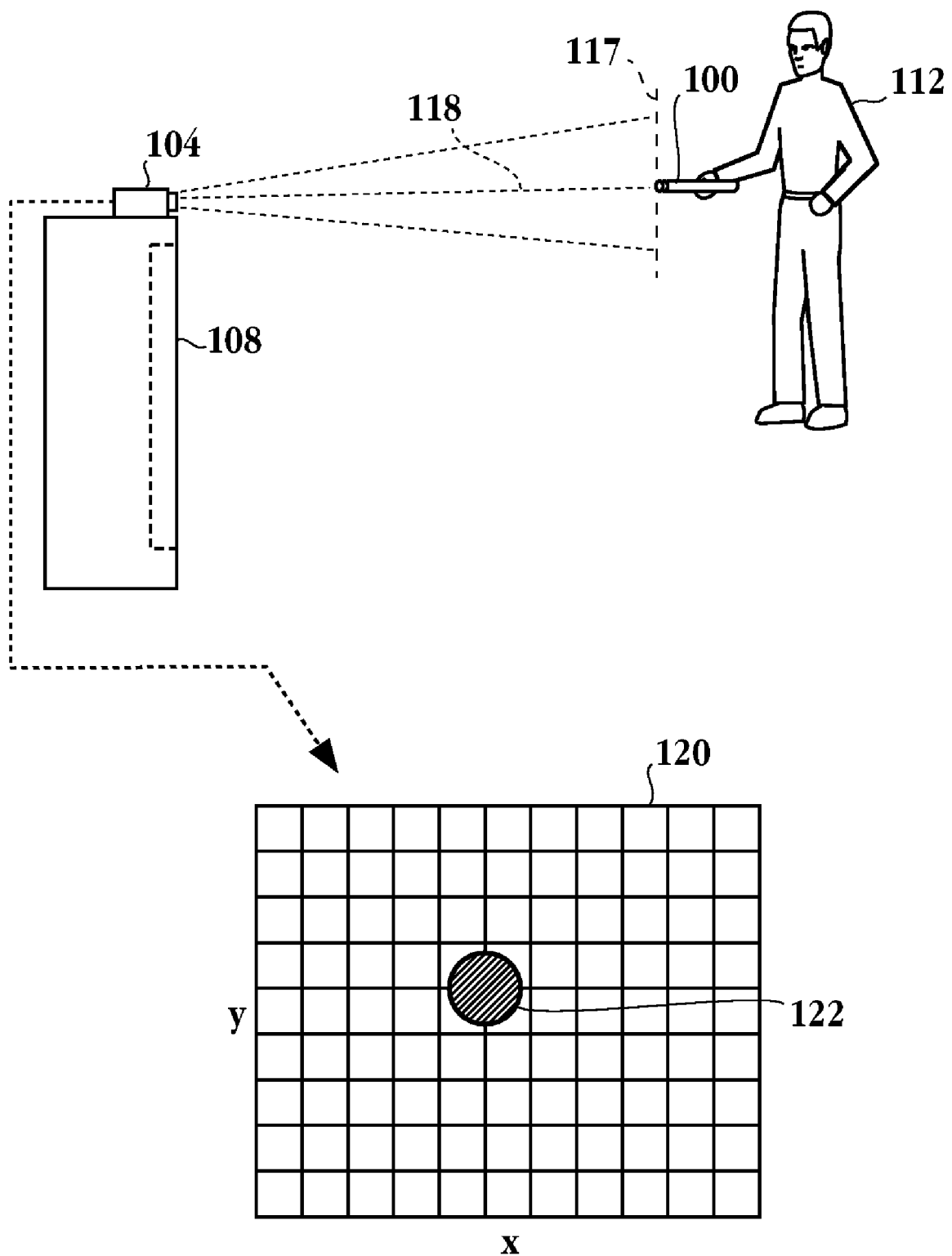
FIG. 2 is a simplified schematic diagram illustrating the capture of light from a light source through an image capture device in accordance with one embodiment of the invention.

FIG. 2 is a simplified schematic diagram illustrating the capture of light from a light source through an image capture device in accordance with one embodiment of the invention. Here, user 112 is holding input device 100 which includes a light source thereon. Image capture device 104 monitors a field of view 118 through which light from the light source of input device 100 is detected. The light source associated with input device 100 is within plane 117, which corresponds to digitized screen 120. Here, an image of the light source associated with input device 100 is illustrated by region 122 of screen 120. It should be appreciated that the resolution of screen 120 may be associated with any suitable resolution typical of a web cam or other suitable camera. In one embodiment, screen 120 is defined by a screen size of 320×240. Thus, as user 112 moves input device 100, the associated movement is captured through capture device 104 to determine a location of the light source within screen 120. It should be appreciated that the screen size and the imaging device size are decoupled. However, the screen and image device size are mapped in order to determine corresponding positions between the two. In one embodiment, the image device is mapped to a region of the screen. Here, most of the screen is used for displaying a scene, game image, etc., and there is a relatively small input palette in a corner or some other suitable region of the screen.

Figure 3:
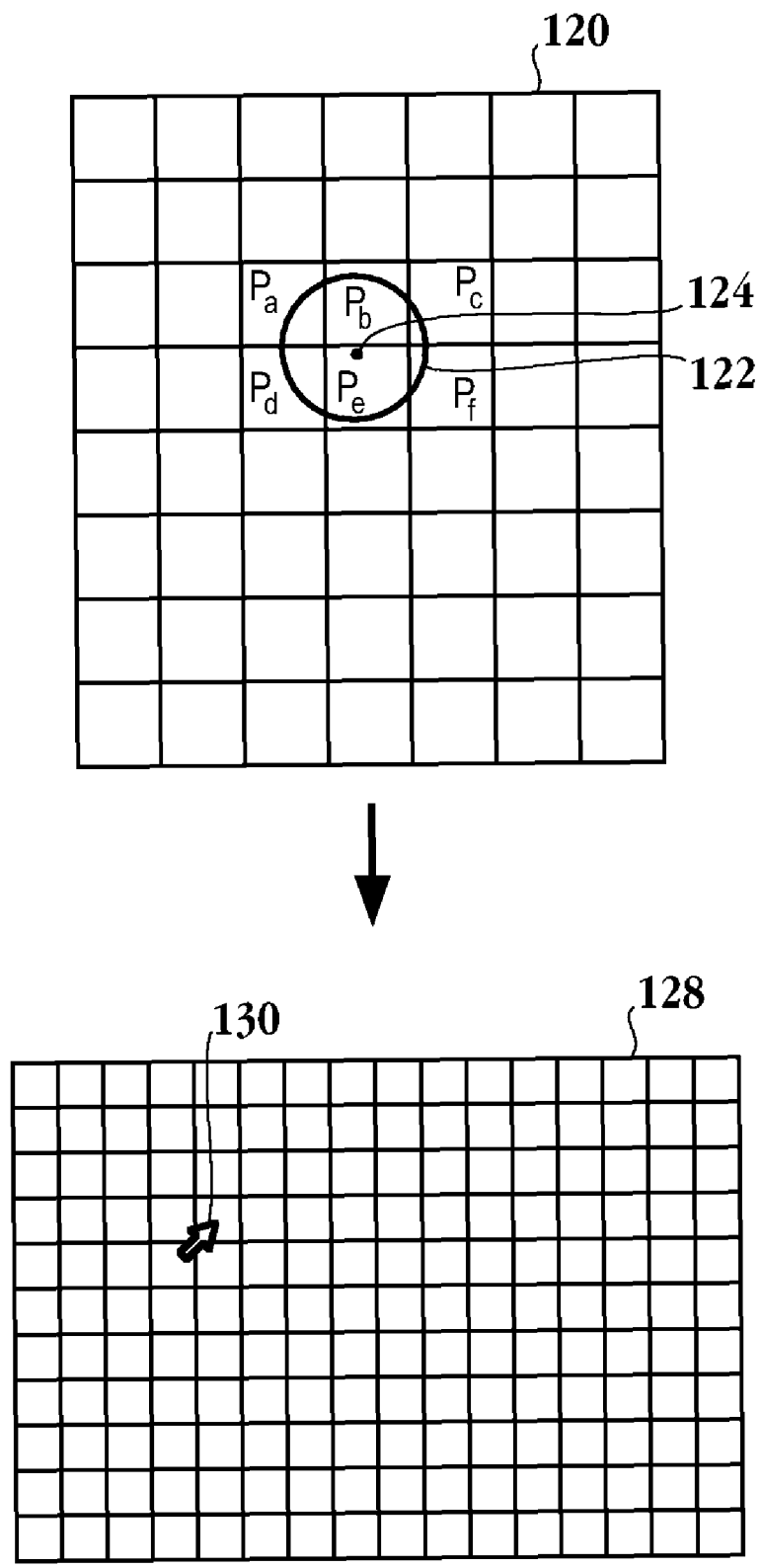
FIG. 3 is a schematic diagram illustrating the determination of the location of a light source and the subsequent translation of that location to control movement of a corresponding cursor on a display screen in accordance with one embodiment of the invention.

FIG. 3 is a schematic diagram illustrating the determination of the location of a light source and the subsequent translation of that location to control movement of a corresponding cursor on a display screen in accordance with one embodiment of the invention. Here, screen 120 defines an image of a light source as region 122. Region 122 includes portions of pixel $P_a$, $P_b$, $P_c$, $P_d$, $P_e$, and $P_f$. The remainder of each of the pixels in screen 120, i.e., all pixels except pixels $P_a$-$P_f$, are black. In one embodiment, ensuring that the remainder of the pixels is black is achieved through a masking operation. The masking operation includes reducing the size of an aperture of image capture device 104 in order to minimize an amount of light allowed into the image capture device. In one embodiment, the aperture size may be adjusted electronically by adjusting the sensor game and exposure time. This scheme enhances the ability to detect a light source while reducing interference effects associated with background lighting. It should be appreciated that since the characteristics of the light input device and the image capture device are known, then the image capture device parameters (white balance, gain, exposure, saturation, etc.) may be set explicitly to track a particular pre-determined pixel value, i.e., no calibration is required. As the input device is a light, the room lighting is not a factor here. Thus, an active method for detecting a light change is provided.

Still referring to FIG. 3, center 124 of region 122 is calculated through a centroid calculation in which the center's of each of pixels $P_a$-$P_f$ are calculated and then weighted according to the associated pixel value in order to determine the coordinates of center 124. The coordinates of center 124 are then mapped to display screen 128, which corresponds to the display screen being viewed by the user. Thus, movement of the light source will cause movement of region 122 on grid 120, which may also be referred to as a screen associated with the image capture device. The corresponding movement of region 122 will be associated with the calculation of a new center. The new center will then be mapped to a location on screen 128 in order to move cursor 130 on screen 128 so that the user is given a feeling of control, over the movement of cursor 130 through the LED input device. As will be explained in more detail below, the input device may have a button or some other suitable activation device which when pressed will cause the respective LED to change to a different color from a previous color. This different color is then captured by image capture device 104. The detection of the different color results in different pixel values being associated with the change in color. For example, the pixels corresponding to region 122 will be associated with different values by the color change. The different pixel values will then signal the mode change similar to a mode change signal associated with a mouse click. Thus, a user may click and drag, highlight, etc., images on the display screen. That is, the user may perform any functionality achieved through a mouse associated with a computer.

In one embodiment, the centroid calculation is performed as described hereafter. The pixels not associated with pixels $P_a$-$P_f$ are assigned a value of 0 as no light is detected, i.e., the pixels are black. It should be appreciated that the masking technique described above may be used to ensure that the image capture device can lock in on a light emanating from an input device by reducing interference from background lighting. Each of pixels $P_a$-$P_f$ are assigned a value corresponding to the amount of area of the pixel intersecting with region 122. In one embodiment, where pixel values are assigned from 0-255, 0 corresponding to no light, pixel $P_e$ is assigned the highest value while pixel $P_f$ is assigned the lowest value. For exemplary purposes the pixel values of pixels $P_a$, $P_b$, $P_c$, $P_d$, $P_e$, and $P_f$ are 121, 230, 80, 123, 240, and 10, respectively. Each of pixels $P_a$-$P_f$ is associated with a respective pixel center point. Each of the two dimensional coordinates of each of the pixel centers is multiplied by the value of the respective pixel. These weighted values for one of the two dimensional coordinates are then summed together. In one embodiment, the summation of the weighted values for each coordinate is then divided by the summation of the pixel values associated with region 122 in order to provide the coordinates for the center of region 124. This technique may be described mathematically as:

$$(x, y)_{center} = \sum [[(x_{pixel\ center}][\text{value of pixel for } x_{pixel\ center}]] / \sum (\text{pixel values}) \text{ and } \sum [[(y_{pixel\ center}][\text{value of pixel for } y_{pixel\ center}]] / \sum (\text{pixel values})$$

Here, (x,y)center represent the two coordinates of center 124, xpixel center represents the x coordinate for each of pixels Pa-Pf, and ypixel center represents the y coordinate for each of pixels Pa-Pf. Thus, center 124 corresponds to a certain location of the image of the capture device. This position corresponds to a location on screen 128. With reference to video frames, (x,y)center may be calculated for each frame of the video and the location of (x,y)center is used to set a position of cursor 130 on screen 128. In one embodiment, a resolution associated with grid 120 is less than the resolution associated with screen 128, thereby enabling smooth movement of cursor 130 across screen 128. It will be apparent to one skilled in the art that a non-weighted centroid may also be determined, especially if the background is not known, e.g., the background is not all black. Here, the location of the centroid may not be as accurate as when the background is known, however, the accuracy is still suitable for the embodiments described herein. In one embodiment, the non-weighted centroid is calculated when the user is in a dark room or with an infrared LED and camera. It will be apparent to one skilled in the art that while FIGS. 1A, 1B, 2, and 3 refer to a cursor, the embodiments are not limited to use with a cursor. In essence any suitable indicator that provides feedback on the second location of the input device may be used. For example, effects like distortion, brightening, darkening, telescope windowing, etc. may be employed to provide feedback on the second location of the input device.

Figure 4:
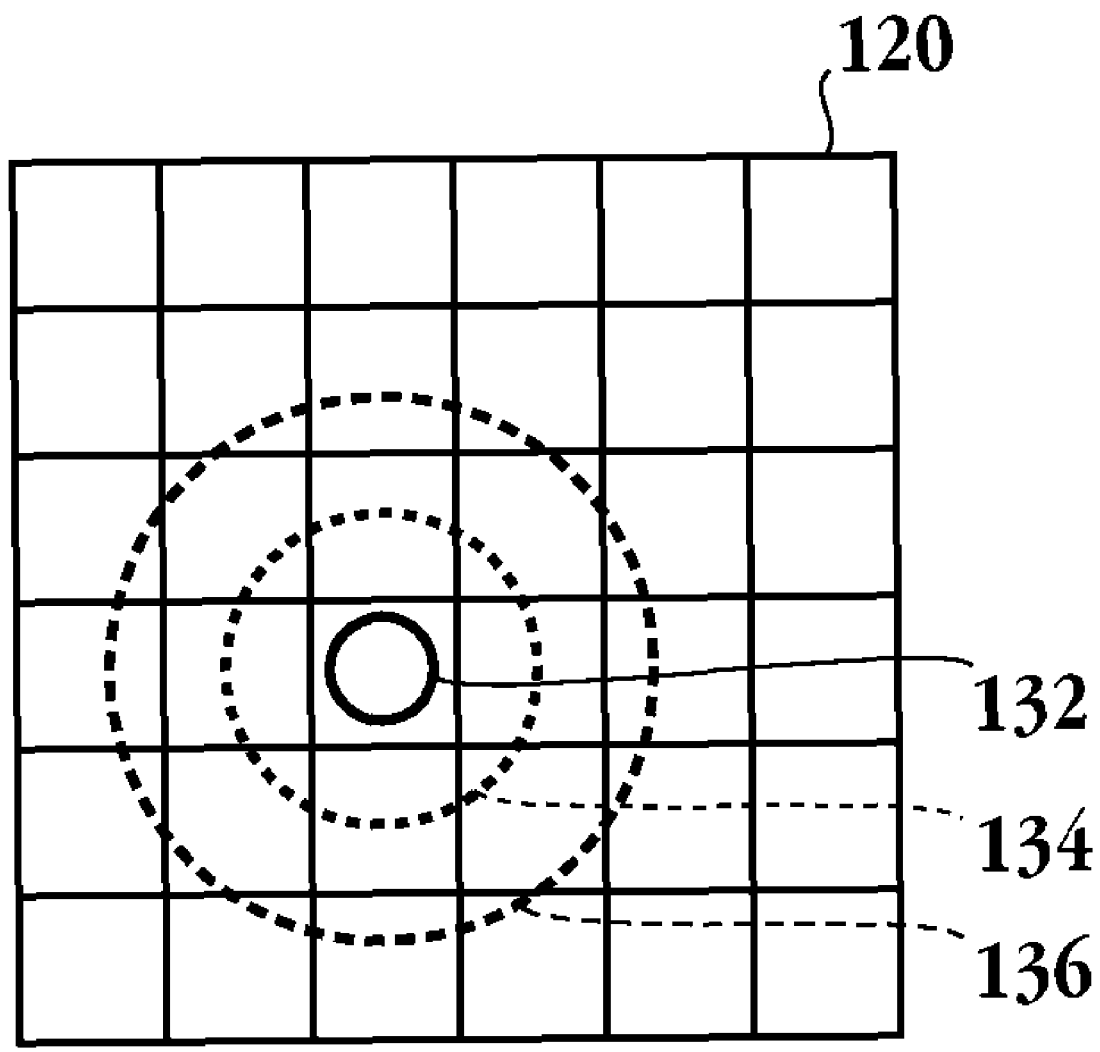
FIG. 4 is a schematic diagram illustrating a scheme for enhancing a tracking and translation methodology in accordance with one embodiment of the invention.

FIG. 4 is a schematic diagram illustrating a scheme for enhancing a tracking and translation methodology in accordance with one embodiment of the invention. It should be appreciated that where a light source is captured through image capture device 104 and subsequently located within screen 120, the corresponding region associated with the light source is contained within one pixel. Thus, the subsequent translation to a cursor may cause the cursor movement to appear jumpy, due to the quantization effect of the discrete sampling of the image capture device. In order to alleviate the jumpiness, image capture device may be defocused to blossom or expand the region associated with the light source. For example, region 132 represents an initial capture of a corresponding light source. As can be seen, region 132 is contained within one block of grid 120, which represents a single pixel. In order to expand or blossom region 132 the image capture device is defocused where regions 134 and 136 represent different defocusing parameters. Thereafter, the centroid of the expanded region may be calculated as discussed above. In one embodiment, a diffuser is placed over the LED to defocus the light source. For example, the diffuser may be a piece of tape that causes the light to diffuse.

Figure 5:
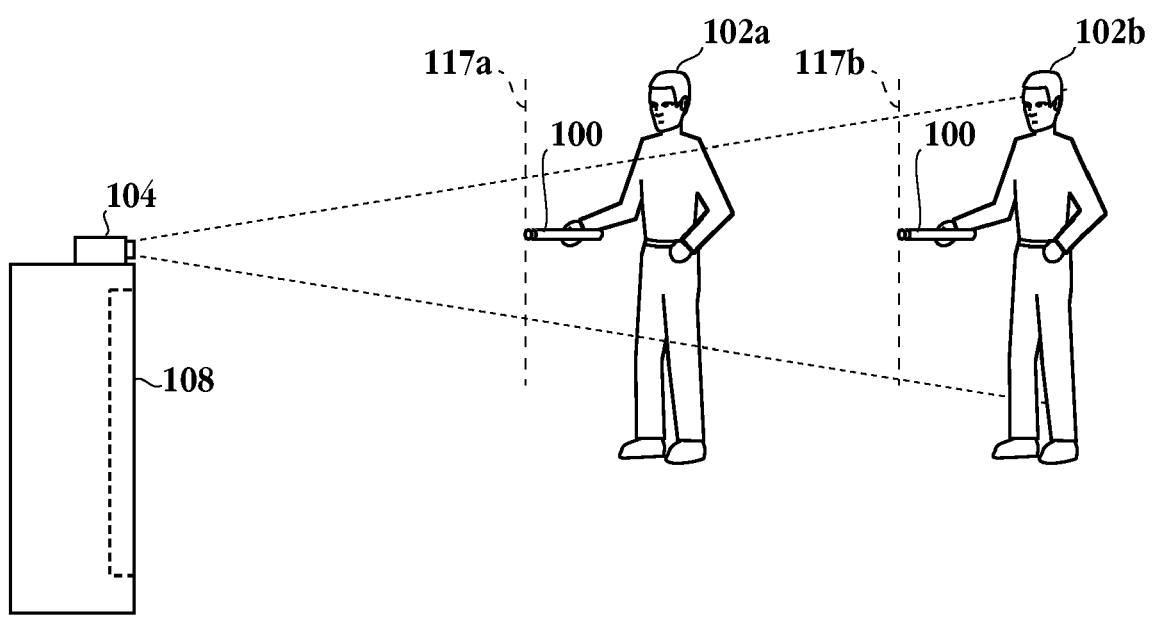
FIG. 5 is a simplified schematic diagram illustrating a scheme for setting a scale dependent upon the distance a user is from the image capture device in accordance with one embodiment of the invention.

FIG. 5 is a simplified schematic diagram illustrating a scheme for setting a scale dependent upon the distance a user is from the image capture device in accordance with one embodiment of the invention. Here, user 102a is at a first distance associated with image plane 117a while user 102b is at a second distance corresponding to image plane 117b. It is not necessary that image capture device 104 has depth capability, as the corresponding scales from images captured at image plane 117a and image plane 117b may be used to provide a relative degree of distance corresponding to respective image areas occupied by user 102a and user 102b. According to this relative degree of distance, the amount of movement for input device 100 to cause a corresponding movement of a cursor on display screen 108 may be adjusted. For example, if the user is closer to image capture device 104, then larger movements may be used to correspond to a movement of a cursor as compared to smaller movements when the user is at a farther distance.

Figure 6:
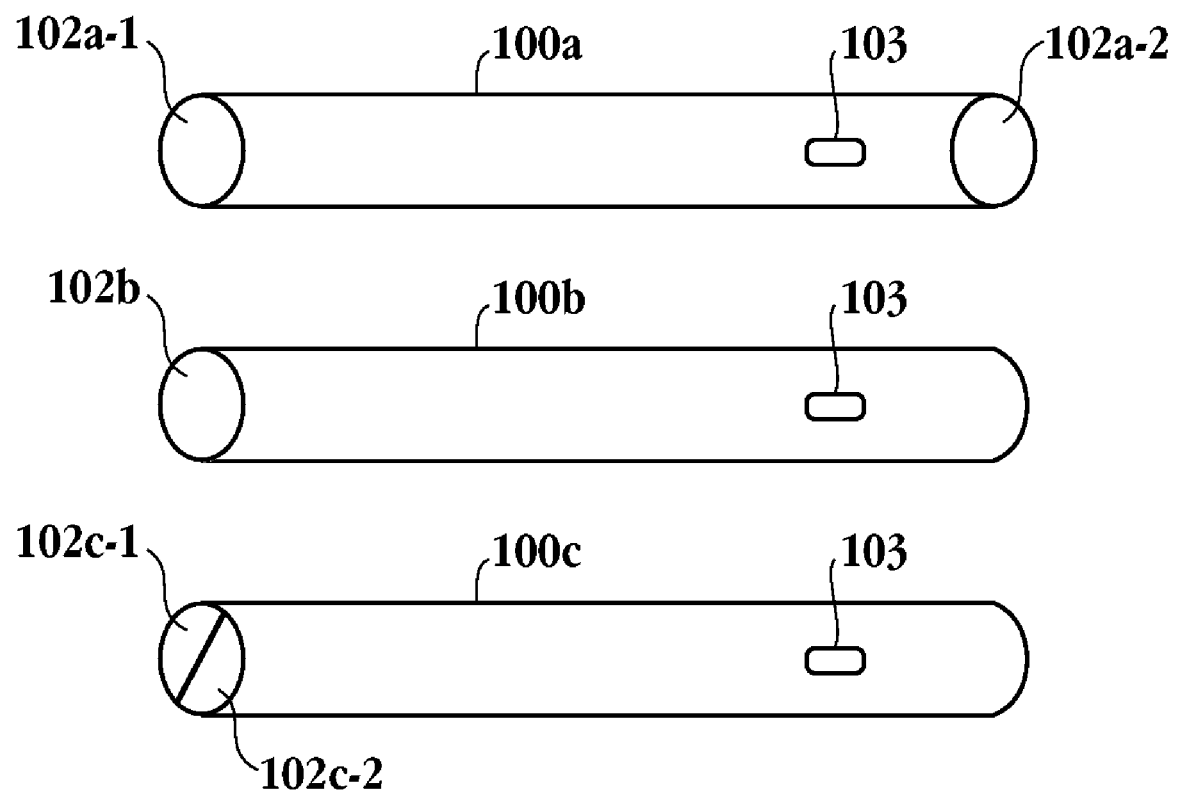
FIG. 6 represents alternative configurations of an input device in accordance with one embodiment of the invention.

FIG. 6 represents alternative configurations of an input device in accordance with one embodiment of the invention. Input device 100a includes LED 102a-1 and LED 102a-2 located at opposing ends of the input device. Button 103 is included on the body of input device so that a user may press the button in order to trigger a light change for a corresponding LED. More than one button may be incorporated into input device 100a in order to accommodate multiple LED's in one embodiment. Input device 100b includes a single LED 102b at an end of the input device. Here, LED 102b is capable of emanating multiple colors as button 103 is pressed. Input device 100c illustrates multiple LED's located adjacent to each other. Here, LED 102c-1 is adjacent to LED 102c-2. As an alternative to input device 100c, the input device may have a fork-type configuration where an LED is affixed to each of the ends of the prongs (tines) of the fork. Button 103 may also be used to trigger one of the LED's to emit light while another is off. Button 103 may also be referred to as a mode change activator. A mode change activator is broadly defined as any suitable mechanism that may be used to cause the LED to switch between colors of light and/or variations of colors of light. For example, the mode change activator may be a button, a switch, a rotary dial, etc. In addition, the LED's may be located elsewhere on the body of the input devices shown in FIG. 6. For example, LED's may be incorporated on the sides of the input device. Alternatively, a line of LED's along the side of the input device may be provided. In another embodiment, a large LED at an end of the input device is provided, thereby enabling a capture device to detect a change in shape when the input device is tilted. That is, the input device may be configured to enable the capture device to detect a change in angle of the input device relative to the capture device. For example, a user may angle the input device up, down or to the side in order to cause a certain mode change or response to the particular angle change. One skilled in the art will appreciate that numerous other suitable configurations are possible for the input device besides the configurations illustrated in FIG. 6. Thus, the embodiments described herein are not limited to the exemplary configurations of FIG. 6.

Figure 7:
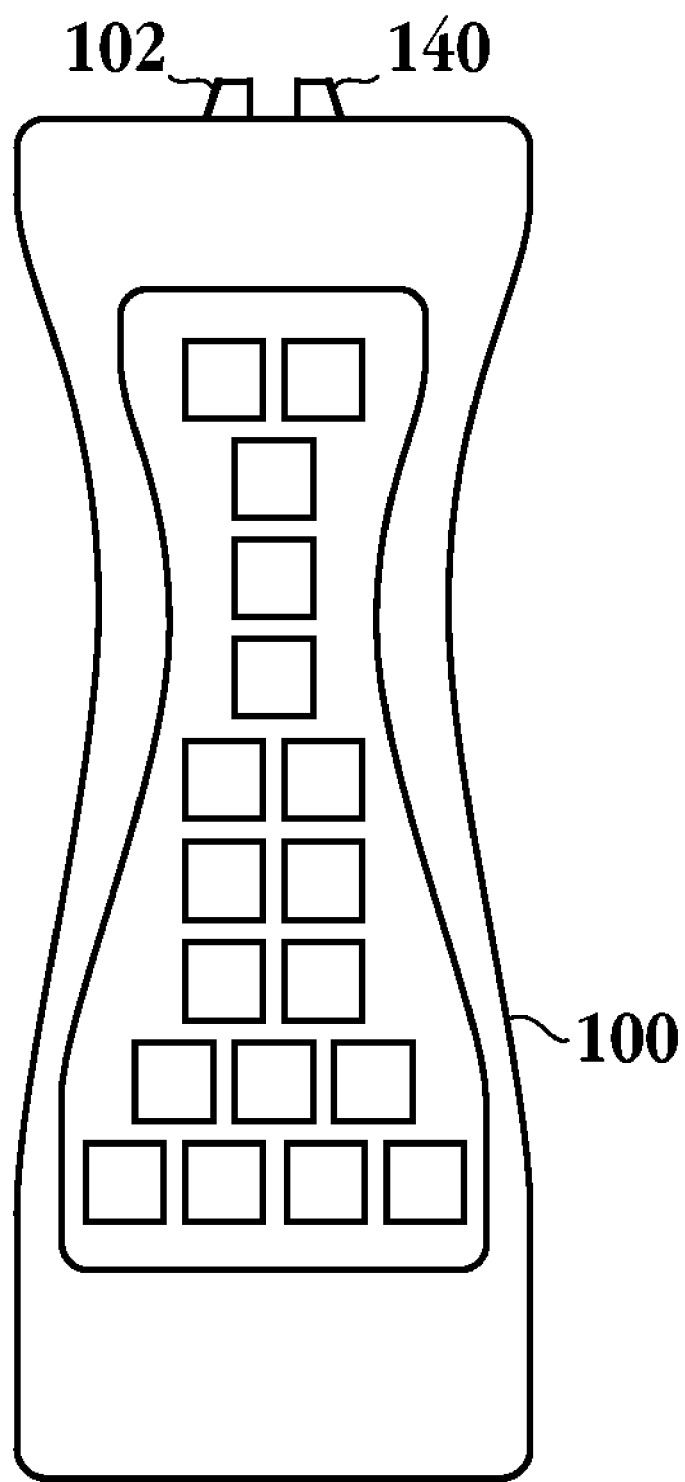
FIG. 7 illustrates an alternative embodiment for the input devices illustrated in FIG. 6.

FIG. 7 illustrates an alternative embodiment for the input devices illustrated in FIG. 6. Here, input device 100 is configured as a remote control device which includes LED 102 and infrared capability indicated by light 140. Thus, the input device may be incorporated into a suitable remote control commonly used for television sets. In one embodiment, an LED capable of toggling between at least three colors is provided. Here, a third color may be used to provide functionality corresponding to a "right click" on a computer mouse.

Figure 8A:
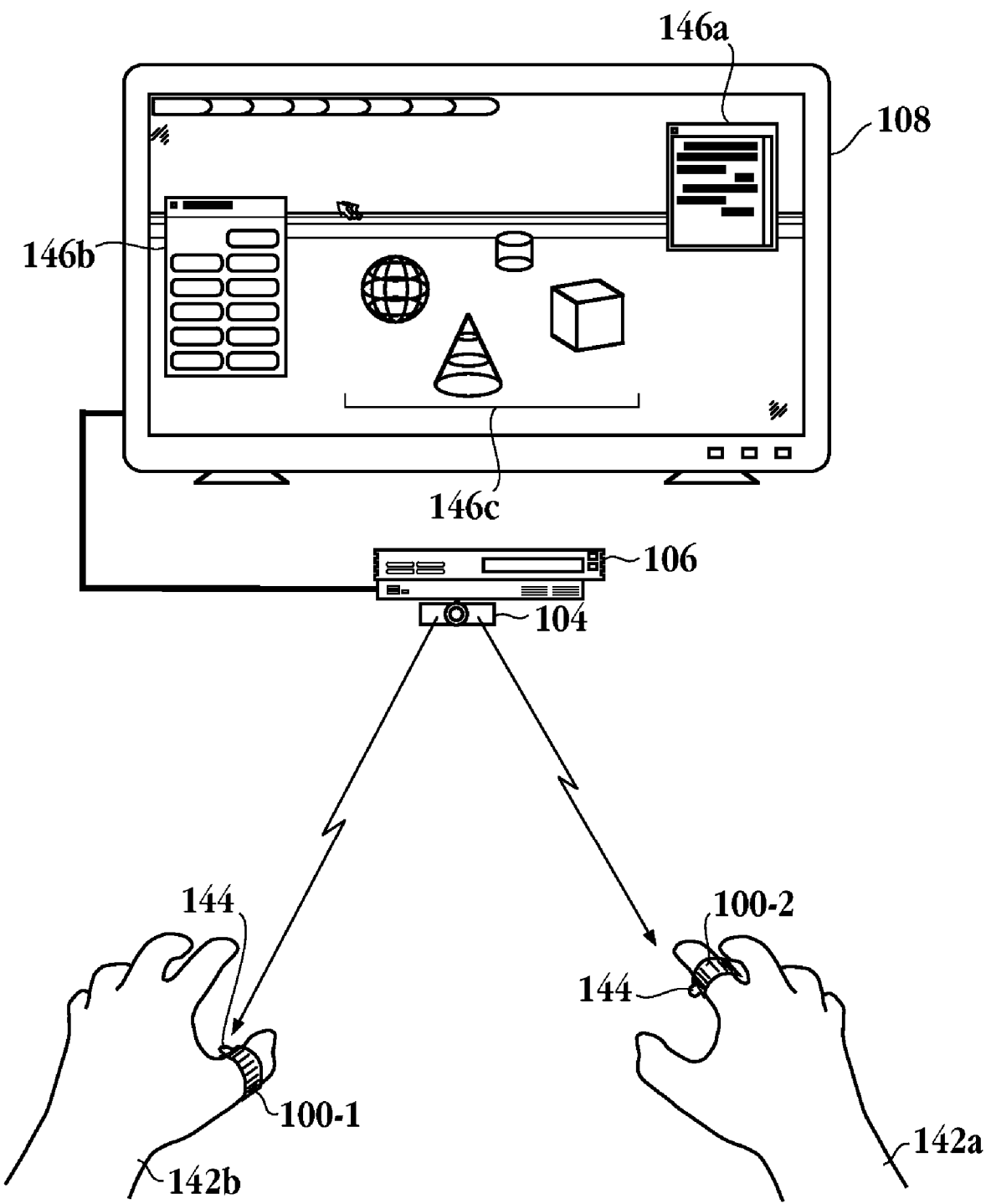
FIG. 8A is a simplified schematic diagram of a pair of input devices configured to communicate with a computing device in communication with a display monitor in accordance with one embodiment of the invention.

FIG. 8A is a simplified schematic diagram of a pair of input devices configured to communicate with a computing device in communication with a display monitor in accordance with one embodiment of the invention. External input devices 100-1 and 100-2 are configured to fit over a finger or thumb of a user's hands 142a and 142b. As shown, each of input devices 100-1 and 100-2 is capable of emanating light that is detected by image capture device 104 which is in communication with computing device 106. While image capture device 104 is shown outside of the frame of computing device 106, it should be appreciated that the image capture device may be integrated into the computing device in one embodiment of the invention. Input devices 100-1 and 100-2 transmit different color light signals in one embodiment. Computing device 106 is in communication with display monitor 108. Computing device 106 transmits digital data to display monitor 108 so that the digital data can be viewed. Display monitor 108 may display text 146a, menu 146b and/or graphics 146c.

Of course, it should be noted that any suitable digital data may be displayed. In one embodiment, where computing device 106 is a game console, display monitor 108 displays graphics or a user interface associated with a game being played.

Each of input devices 100-1 and 100-2, of FIG. 8A, is configured to generate different colors of light. In one embodiment, input devices 100-1 and 100-2 may emanate a common color of light and at least one different color of light. It should be appreciated that button 144 may be used to toggle between the different colors of light. The light may be emitted through a LED on the side of the ring band of input devices 100-1 and 100-2. Alternatively, input devices 100-1 and 100-2 may be configured as thimbles, where a LED is affixed to the base of the thimble. In another embodiment, a single input device is employed rather than multiple devices. It should be appreciated that input devices 100-1 and 100-2 are configured to fit comfortably over a user's finger or thumb. Thus, different sizes can be made available based upon a user's age, gender, etc. Alternatively, the input devices may be made to be adjustable. That is, elastic straps, or even VELCRO straps, may be incorporated to secure the input device to the user's finger or thumb in one embodiment of the invention.

Figure 8B:
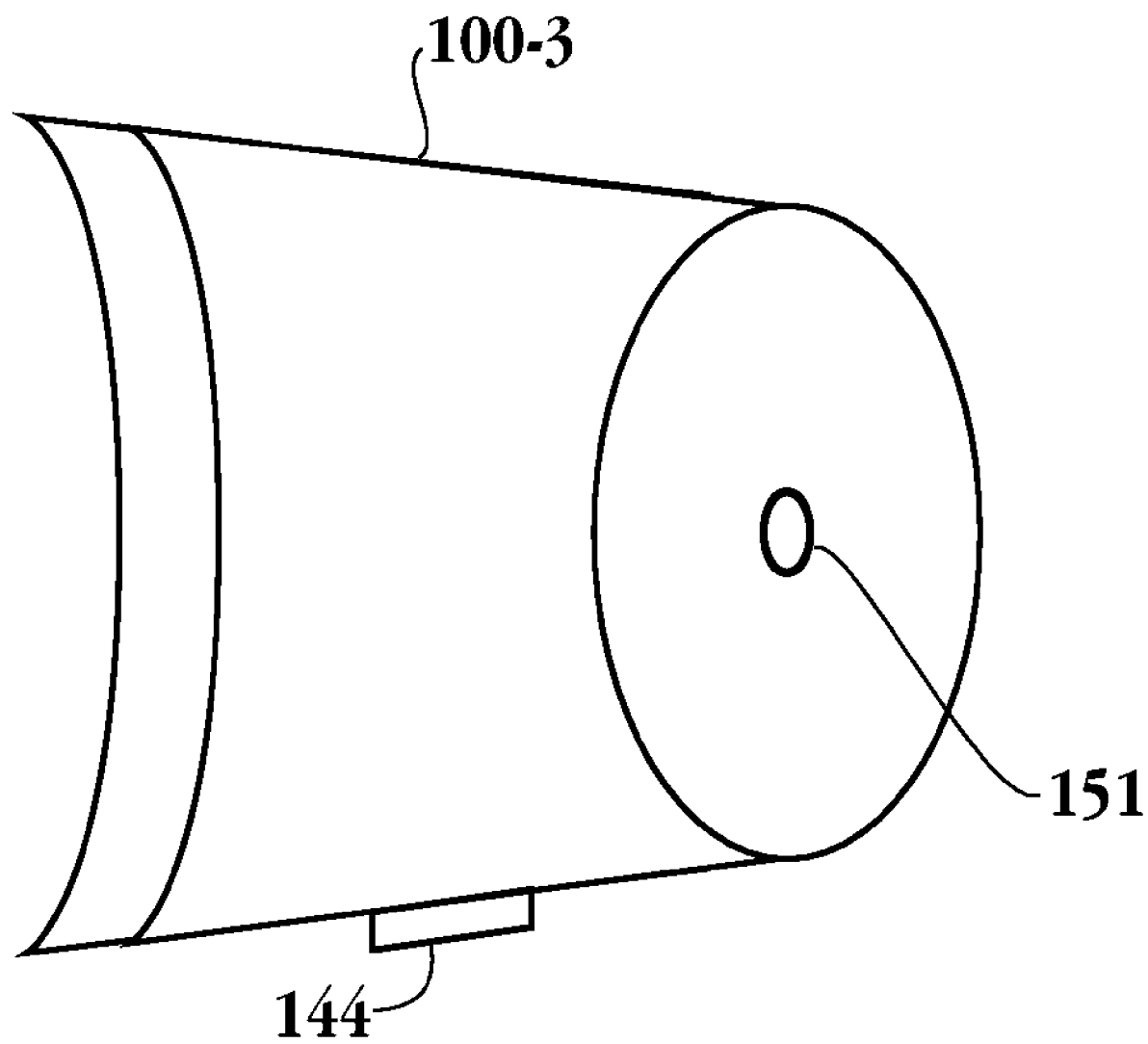
FIG. 8B is a schematic diagram of an alternative light input device configuration to the rings of FIG. 7.

FIG. 8B is a schematic diagram of an alternative light input device configuration to the rings of FIG. 7. Here, thimble body 100-3 includes button 144 which is configured to change the light or frequency of light being emitted through LED 151. Of course, more than on LED may be located on the base of thimble 100-3, as discussed with reference to FIG. 6.

One skilled in the art will appreciate that the image capture device and the computing device include logic capable of providing the functionality described herein. The logic may include software elements and/or hardware elements. For example, the software elements may include software code processed through a central processing unit. The hardware elements include logic gates and circuitry configured to achieve the functionality described herein. It will be apparent to one skilled in the art that the hardware elements, e.g., logic gates, may be synthesized to execute the functionality described herein. Of course, the system may include a combination of software and hardware elements interacting to provide the desired outcome also.

Figure 9:
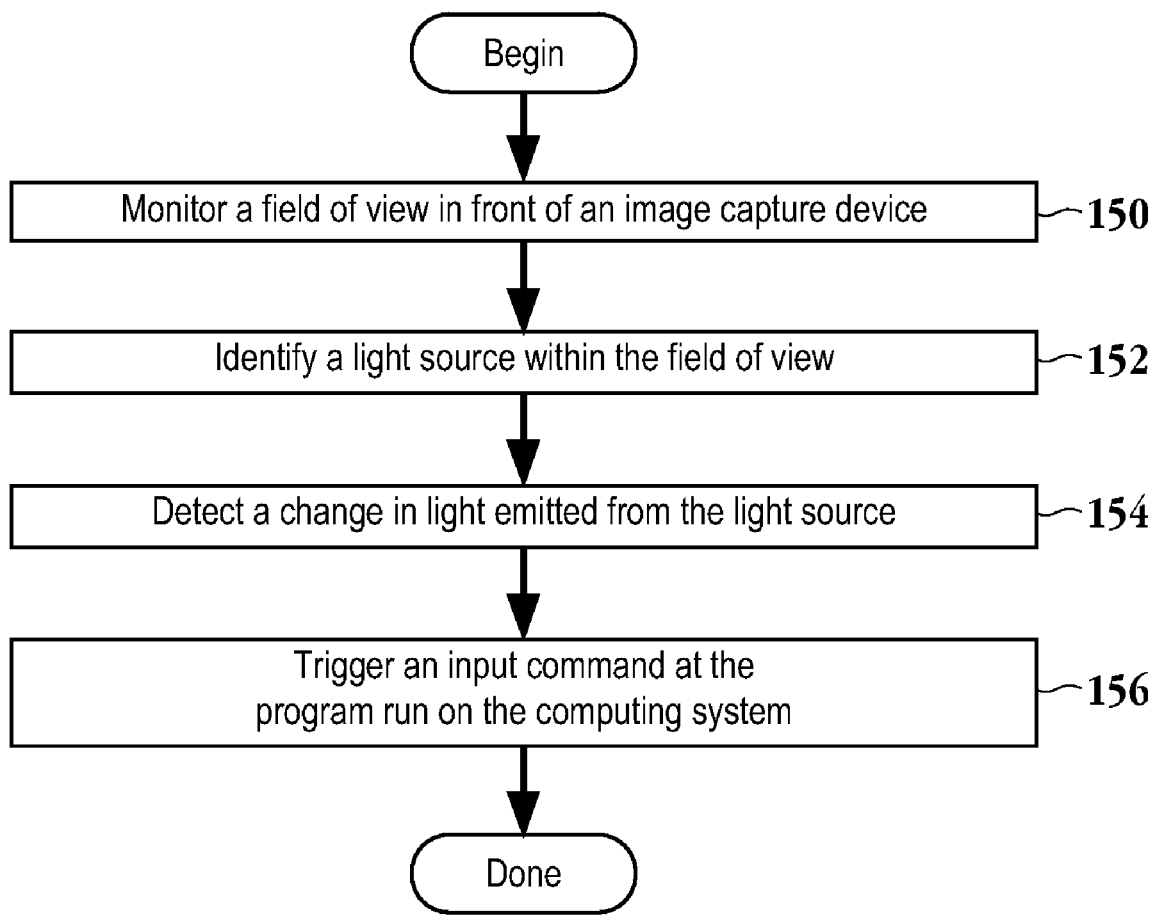
FIG. 9 is a flow chart diagram illustrating the method operations for triggering input commands for a program running on a computing system in accordance with one embodiment of the invention.

FIG. 9 is a flow chart diagram illustrating the method operations for triggering input commands for a program running on a computing system in accordance with one embodiment of the invention. The method initiates with operation 150 where a field of view in front of an image capture device is monitored. Here, the field of view may capture a light source emanating from an input device having an LED capable of emitting multiple colors of light, as described with reference to FIGS. 1A through 2. The method then advances to operation 152 where a light source within the field of view is identified. As described above, the light source emanates from the LED. The method then proceeds to operation 154 where a change in light emitted from the light source is detected. Here, a button may be pressed in order to change the color of light emitted from an LED which is then captured by the image capture device. That is, pixel values will change when the change in the color of light occurs. As used herein, the change in the color of light may refer to an actual color change, e.g. from red to green. However, the change of color may also refer to a variation of the color, e.g., one yellow variant to another yellow variant. In essence, any suitable change that will cause a corresponding change in the pixel values associated with the colors or variants may be used here. The method then moves to operation 156 where an input command at the program run on the computing system is triggered in response to the change in the color of light. For example, a mode change associated with a mouse click on a desktop computer may be triggered here. Thus, click and drag functionality, highlighting functionality, and any other suitable functionality achieved through a mouse click is capable of being introduced in the "living room" environment without the traditional mouse and keyboard hardware. In addition, the input command triggered by the light change can be an action, a movement cue, a modality change, etc.

Figure 10:
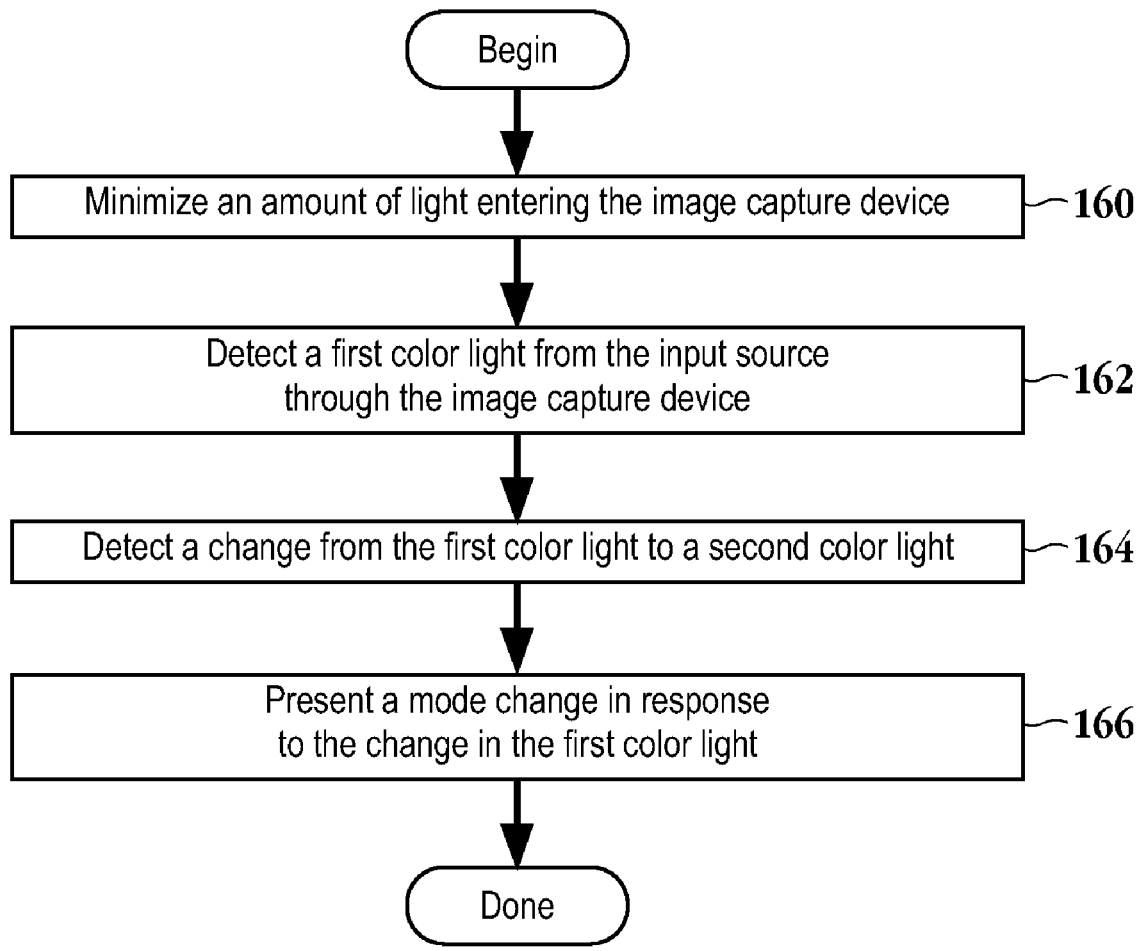
FIG. 10 is a flow chart diagram illustrating the method operations for detecting input commands from an input source within a field of sight of an image capture device in accordance with one embodiment of the invention.

FIG. 10 is a flow chart diagram illustrating the method operations for detecting input commands from an input source within a field of sight of an image capture device in accordance with one embodiment of the invention. The method initiates with operation 160 where an amount of light entering the image capture device is minimized. That is, an aperture of the image capture device may be reduced in order to mask background lighting. Thus, the minimization of the background lighting will enhance the tracking capability of a light source such as the input device described herein. For example, the reduction in the amount of light entering the image capture device may be achieved as described with reference to FIG. 3. The method then advances to operation 162 where a first color light from the input source is detected through the image capture device as described with reference to FIGS. 2-4. Here, the first color light is detected and correlated to an image screen.

The method of FIG. 10 then proceeds to operation 164 where the first color light being changed to a second color light is detected. Here, the change in the color of light may be triggered through pressure applied to a button or mode change activator on the input device as described above. One skilled in the art will appreciate that the color change, or frequency change, may be detected by examining corresponding pixel values associated with an image capture device. The method then moves to operation 166 where a mode change is presented in response to the change in the first color light. The mode change may act to enable a user to perform click-and-drag operations, highlighting operations, or any other suitable operations associated with a mode change such as enabled through a computer mouse. Additionally, when the second color light is changed back to the first color light, the end of a click-and-drag operation or highlighting operation is signified. Alternatively, a third color light may be used to enable functionality associated with a "right" mouse click. It should be noted that the mode change is displayed on a display screen similar to the mode change for a computer mouse in one embodiment of the invention. Additionally, one skilled in the art will appreciate that while FIG. 10 is described with respect to color changes, the invention is not limited to color changes as variations of the same color of light may be used, e.g., shades of colors. Furthermore, different frequencies of light may be used instead of different colors. For example, infrared light may be used with a visible wavelength of light. As discussed above, any change to a light source that is capable of causing a change in pixel values associated with an image capture device may be used for the embodiments described herein.

In summary, an input device capable of triggering a mode change through a multi-color, or multi-frequency, light generator is provided. Of course, multiple collocated lights having different colors or frequencies may be used to provided the same effect. Thus, any light generating structure can be used, whether it is a solid-state device such as a diode, or one or more conventional light bulbs. In one embodiment, the light is provided by one or more LEDs that can be coupled or installed onto a pen-like object. The light emitted from the input device is tracked by an image capture device. The image capture device can take on any number of forms, including a camera, an array of charged coupled devices (CCDs), a digital camera, a conventional camera that is coupled to a digitizer, or a webcam. In general, the image capture device should be able to detect light from the input device (or any object capable of emitting light). Preferably, the input device will generate enough light so as to enable the camera to detect a spot of light, which may be bright relative to other surrounding light.

Thus, in one embodiment, similar to a computer mouse input device, the light from the input device may be set to always be on when it is detected by the camera. Thereafter, to cause control, the user may press a button, or some other suitable triggering mechanism, on the input device to change a color of light (or a frequency) being emitted. The webcam captures the color/frequency change, thereby enabling the color change to act as a button press for a mouse, i.e., mouse click. It should be noted that any suitable number of colors may be tracked and that the input device may have multiple buttons for the multiple colors or the input device may have a single button that cycles through the multiple colors. In another embodiment, instead of changing visible color, the change may be from a first color that changes to general light, as is typical of standard flash lights. In still another embodiment, the input device can flicker between a first light and then to an off state, where not light is emitted at all. For example, an infrared LED may alternate between a first light and an off state. In such a case, when the light is off, the light may stay off for a set period of time. The timing of the off state can then cause one or more same, similar or different states or changes to occur on a display screen.

Furthermore, the input device described herein enables enhanced functionality for interactive entertainment applications. For example, with respect to sports video games, a user may use the input device to design a play, e.g., a play for a football game, basketball game, etc. Strategy games, such as chess and war games, which were previously limited due to the difficulty in adopting the joystick controller to function as a mouse-type device become more user friendly when the input device described herein is used for mouse-type input, instead of the joystick. With respect to a video game that incorporates strategy, a user may be on a hillside directing armies to attack an enemy. In another embodiment, the input device may be used for television programming. The ability to incorporate a mode change associated with the change of a light color in conjunction with the capability to track the movement of the light source enables the accomplishment of these features.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced. For example, although specific examples have been provided for use in relation to video gaming, the applications can be applied to any computer or computing device that will require some interaction. The computing device can be a single stand alone unit or can be interconnected to other computing devices over a local or global network, such as the Internet. Accordingly, the present embodiments are to be considered as illustrative and not restrictive, and the invention is not to be limited to the details given herein, but may be modified within the scope and equivalents of the description.

What is claimed is:

1. A method for triggering input commands of a program run on a computing system, comprising:
    identifying a light source within a field of view in front of an image capture device that is located near a display screen, the light source being set to always on during the identifying and pointed toward the image capture device;
    viewing the light source as it is pointed toward the image capture device, the display screen illustrating objects that can be interacted with;
    masking pixels not associated with the light source, the masking acting to ignore pixels not associated with the light source, the masking further includes adjusting an amount of light entering the image capture device by adjusting an aperture of the image capture device;
    detecting a change in light color emitted from the light source, the detecting occurring while the light source is moved in space and tracked; and
    triggering an input command at the program run on the computing system to initiate an action that can be shown on the display screen, the triggering of the input command occurring in response to the detected change in light color.

2. The method of claim 1, wherein the light source is a light emitting diode (LED) capable of emitting multiple colors of light.

3. The method of claim 1, wherein the method operation of masking pixels includes;
    reducing the aperture of the image capture device.

4. The method of claim 1, wherein the input command causes a mode change linked to a cursor displayed on the display screen associated with the computing system.

5. The method of claim 1, further including:
    calculating a centroid of pixels associated with the light source in an image taken by the image capture device, wherein triggering the action shown on the display screen is based on the centroid.

6. The method of claim 5, wherein calculating the centroid further includes:
    determining pixels associated with the light source in the image;
    assigning a value to each of the determined pixels based on the association with the light source; and
    calculating the centroid by performing a weighted average of coordinates of the pixels, the weighted average being based on the value assigned to each pixel.

7. The method of claim 5, further comprising:
    translating coordinates of the centroid to a location on the display screen associated with the computing system;

detecting movement of the light source within the field of view; and correlating the movement of the light source to movement of a cursor on the display screen.

8. The method of claim 1, further including:

adjusting an exposure time of the image capture device to track a pre-determined pixel value associated with the light source.

9. A method for triggering input commands of a program run on a computing system, comprising:

identifying a light source within a field of view in front of an image capture device that is located near a display screen, the light source being set to always on during the identifying and pointed toward the image capture device, the identifying includes defining an area representing the light source within a grid identifiable in image data produced by the image capture device and expanding the area representing the light source within the grid, the expanding occurring by producing diffusion of light at the light source;

masking pixels not associated with the light source, the masking acting to ignore pixels not associated with the light source, the masking further includes adjusting an amount of light entering the image capture device by adjusting an aperture of the image capture device;

detecting a change in light color emitted from the light source in the area that is expanded that represents the light source, having the produced diffusion of light; and triggering an input command, based on the detected change in light color, at the program run on the computing system to initiate an action that can be shown on the display screen.

10. The method of claim 9, wherein the method operation of identifying a light source within the field of view includes, detecting a position in the image data of an image representing the light source based on a light color of pixels in the image; and calculating a centroid of the image representing the light source through a grid associated with the image capture device.

11. The method of claim 10, further comprising:

translating coordinates of the centroid to a location on a display screen associated with the computing system;

detecting movement of the light source within the field of view; and correlating the movement of the light source to movement of a cursor on the display screen.

12. A method for detecting input commands from an input source within a field of sight of an image capture device positioned near a display screen, comprising:

identifying pixels in image data captured by the image capture device as associated with the input source, wherein the input source is defined to be always on during the identifying;

masking pixels not associated with the input source, the masking acting to convert pixels not associated with the input source as black, the masking further includes minimizing an amount of light entering the image capture device by reducing an aperture of the image capture device;

detecting a first color light from the input source through the image capture device, the first color light being directed in a direction of the display screen and the image capture device, such that directing the first color enables interactive movement of a cursor on the display screen;

while tracking movement in space of the input source, detecting a change from the first color light to a second color light; and presenting a mode change in response to changing to the second color light, the mode change operating to initiate an action that can be shown on the display screen, the operations processed by a processor.

13. The method of claim 12 wherein the method operation of detecting a first color light signal from the input source through the image capture device includes, determining a location of a center of the first color light signal on a coordinate system associated with the image capture device; and mapping the location to a corresponding location on a display screen.

14. The method of claim 12 wherein the method operation of detecting a change from the first color light to a second color light includes, detecting the second color light from the input source; and comparing pixel values associated with the first color light to pixel values associated with the second color light.

15. The method of claim 12 further comprising:

reverting to the first color light from the second color light; and in response to reverting to the first color light, terminating the mode change.

16. The method of claim 12 wherein the mode change is associated with one of a click and drag operation or a highlighting operation.

17. The method of claim 12 wherein the first color light and the second color light originate from one of a single light emitting diode or multiple light emitting diodes.

* * * * *